United States Patent [19]
Yang

[11] Patent Number: 6,086,175
[45] Date of Patent: Jul. 11, 2000

[54] ALTAR WITH VERTICALLY MOVABLE BOXES

[76] Inventor: Chun-Tse Yang, No. 13, Lane 177, Tzu-Li-I Rd., San-Min Dist., Kaohsiung City, Taiwan

[21] Appl. No.: 09/190,943

[22] Filed: Nov. 12, 1998

[51] Int. Cl.[7] .................................................. B65G 1/12
[52] U.S. Cl. .................. 312/268; 312/319.5; 312/319.9; 211/1.56; 221/132
[58] Field of Search ..................... 312/125, 134, 312/135, 117, 268, 267, 305, 319.5, 319.7, 91, 97, 266, 319.9; 211/1.56; 221/132, 124, 92; 198/343.1, 710

[56] References Cited

U.S. PATENT DOCUMENTS

| | | | |
|---|---|---|---|
| 270,895 | 1/1883 | Guest | 312/268 X |
| 878,644 | 2/1908 | Lindke | 211/1.56 X |
| 1,596,620 | 8/1926 | Newman | 312/91 X |
| 1,691,186 | 11/1928 | Greth | 312/268 |
| 2,253,807 | 8/1941 | Persons | 312/97 |

FOREIGN PATENT DOCUMENTS

| | | | |
|---|---|---|---|
| 2580605 | 10/1986 | France | 312/134 |
| 568970 | 11/1957 | Italy | 312/266 |

*Primary Examiner*—Janet M. Wilkens
*Attorney, Agent, or Firm*—Skjerven, Morrill, MacPherson, Franklin & Friel LLP

[57] ABSTRACT

An altar includes a cabinet body and a platform, which is located in front of the cabinet body and which has a flat top surface. The cabinet body has an interior chamber and several columns of compartments, each of which is open to the interior chamber and each of which is provided with an openable door. Several box sets are disposed within the interior chamber, and are located respectively behind the columns. Each of the box sets includes an endless flexible member which can be circulated by a driving unit, and a plurality of boxes which are attached to the flexible member. Each of the flexible members can be controlled by a switch member to circulate or stop. Accordingly, each of the boxes can be moved to be aligned with a selected corresponding column of the compartments.

4 Claims, 10 Drawing Sheets

ALTAR WITH VERTICALLY MOVABLE BOXES

BACKGROUND OF THE INVENTION

1. Field of the Invention

This invention relates to an altar with a cabinet body which is formed with several columns of compartments, more particularly to an altar provided with several columns of boxes, each of which is disposed in the cabinet body, and each of which can be moved to be aligned with a selected corresponding column of the compartments by activating a driving unit and operating a switch member.

2. Description of the Related Art

Referring to FIG. 1, a conventional altar 1 has a cabinet body 11, which has five columns of compartments 12. Although the compartments 12 can accommodate a lot of ancestral tablets or jars for receiving bone ashes, it is inconvenient to use the compartments 12 which are located at a higher level.

SUMMARY OF THE INVENTION

The object of this invention is to provide an altar with a cabinet body which includes several columns of compartments, and several columns of boxes that can accommodate ancestral tablets or bone ashes, each of the boxes being moved vertically to be aligned with a selected corresponding column of the compartments by activating a driving unit and operating a switch member.

According to this invention, an altar includes a cabinet body and a platform, which is located in front of the cabinet body and which has a flat top surface. The cabinet body has an interior chamber and several columns of compartments, each of which is open to the interior chamber, and each of which is provided with an openable door. Several box sets are disposed within the interior chamber, and are located respectively behind the columns. Each of the box sets includes an endless flexible member which can be activated by a driving unit to circulate, and a plurality of boxes which are attached to the flexible member. Each of the flexible members can be controlled by a switch member to circulate or stop. Accordingly, each of the boxes can be moved to be aligned with a selected corresponding column of the compartments.

BRIEF DESCRIPTION OF THE DRAWINGS

Other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
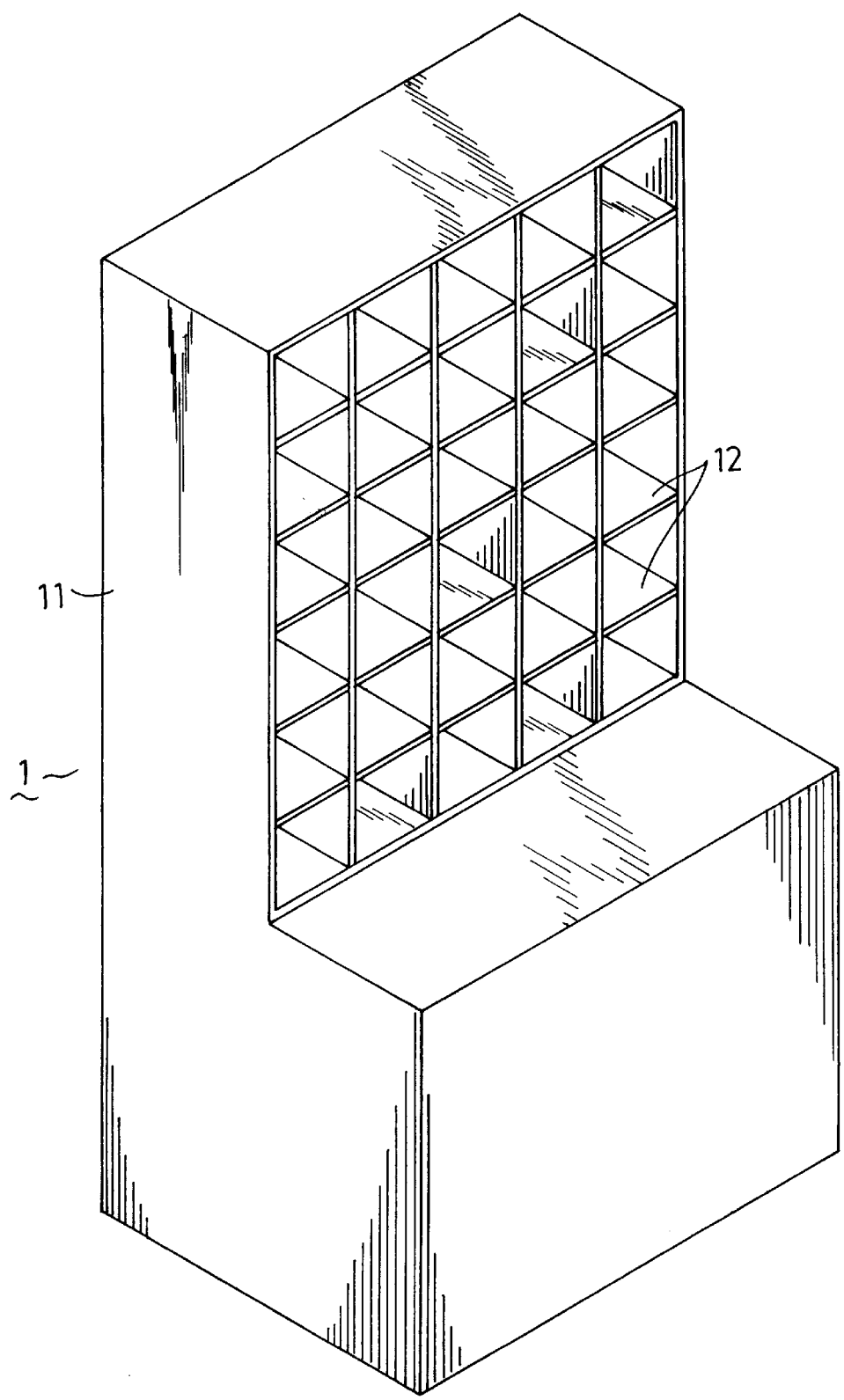
FIG. 1 is a perspective view of a conventional altar.
Figure 2:
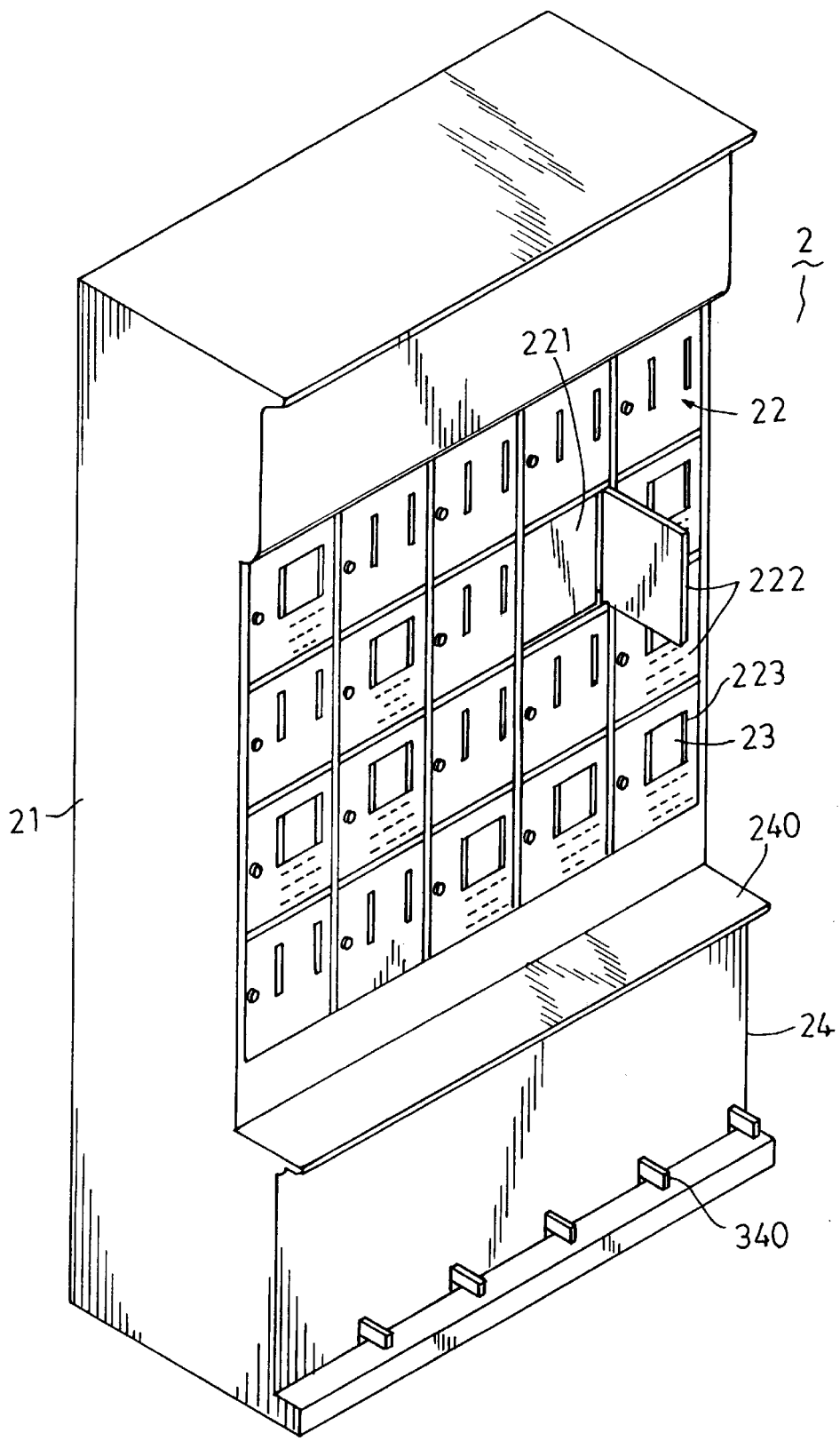
FIG. 2 is a perspective view of a first preferred embodiment of an altar according to this invention.

Referring to FIG. 2, a first preferred embodiment of an altar 2 according to this invention is shown to include a cabinet body 21 which has a front surface that is formed with five columns of compartments 22 at an upper portion of the cabinet body 21. A plurality of boxes 221 are disposed in the cabinet body 21, and are respectively located behind the compartments 22 to accommodate ancestral tablets or jars for receiving bone ashes therein. Each of the compartments 22 has an openable door 222 and two strips 223 for retaining a picture therebetween. A platform 24 is connected fixedly to and located in front of the cabinet body 21, and has a flat top surface 240, which is located at a level below the compartments 22.

Figure 3:
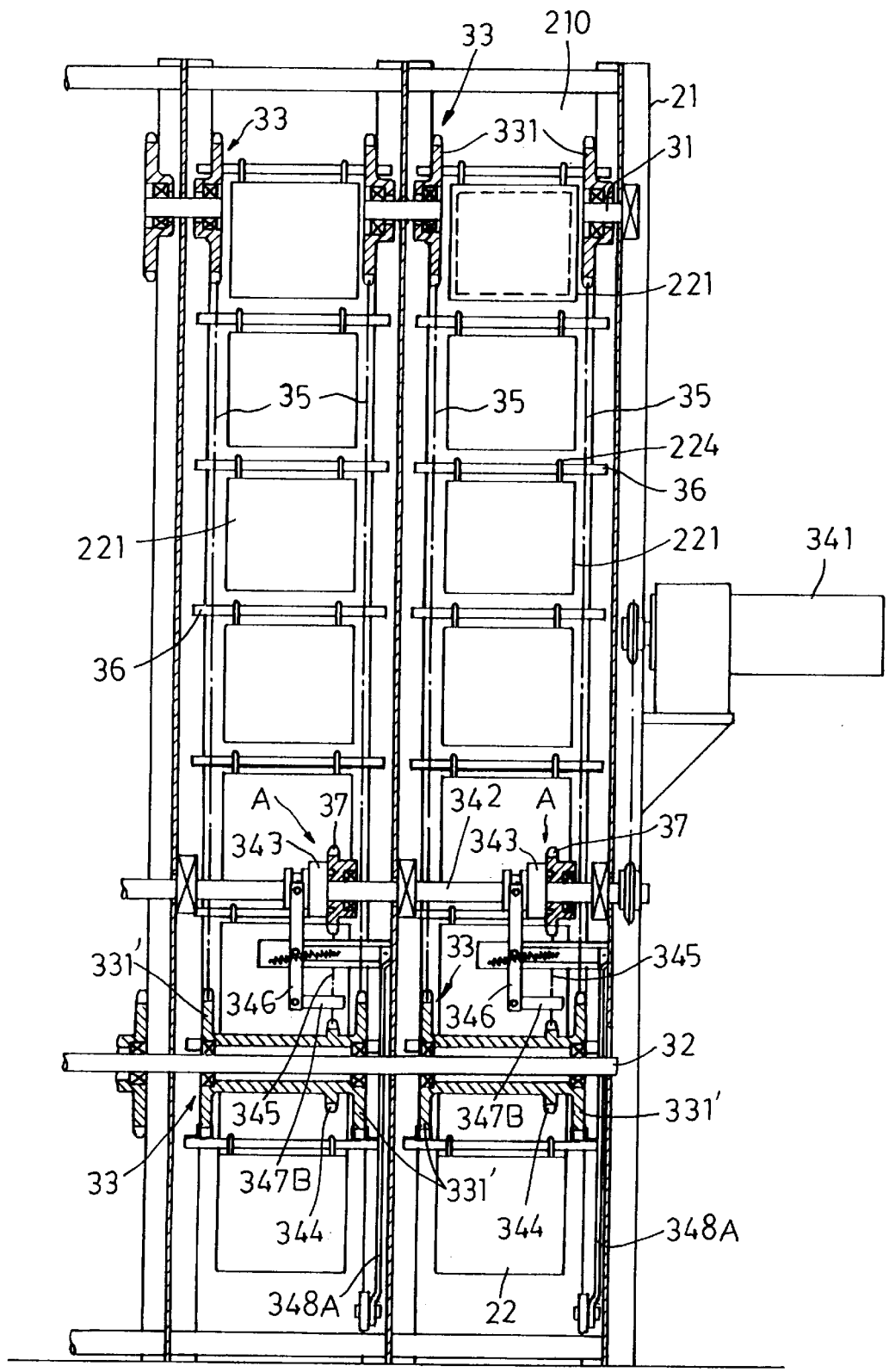
FIG. 3 is a schematic front view illustrating how a driving unit activates a driving shaft in accordance with the first preferred embodiment.
Figure 4:
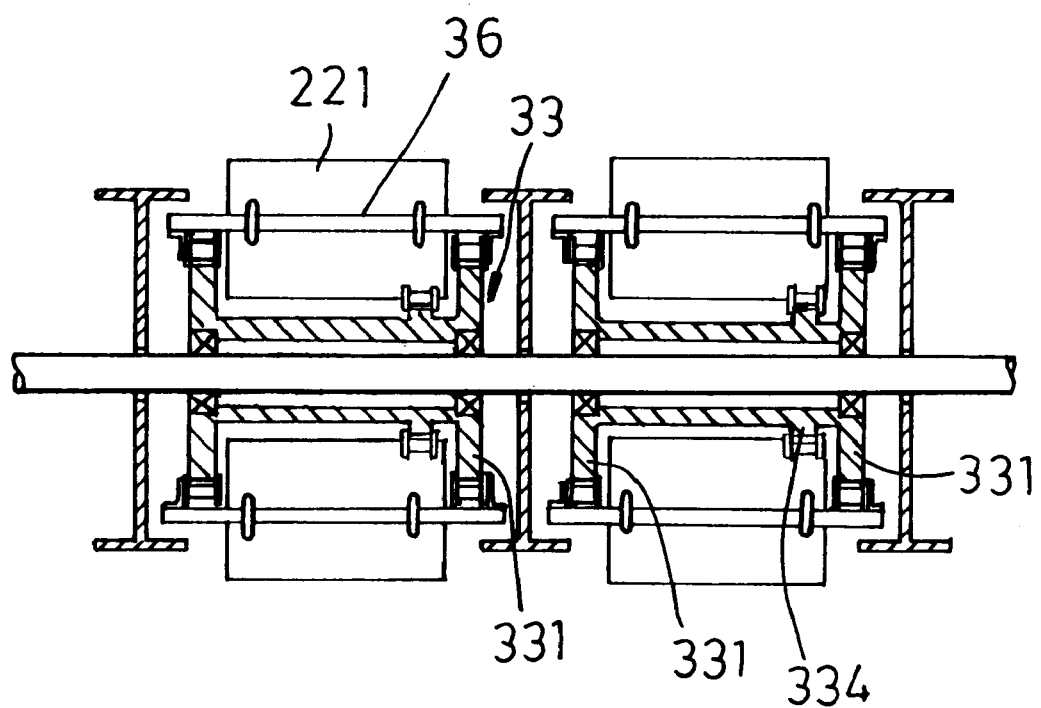
FIG. 4 is a schematic top view illustrating two box sets of the first preferred embodiment.
Figure 5:
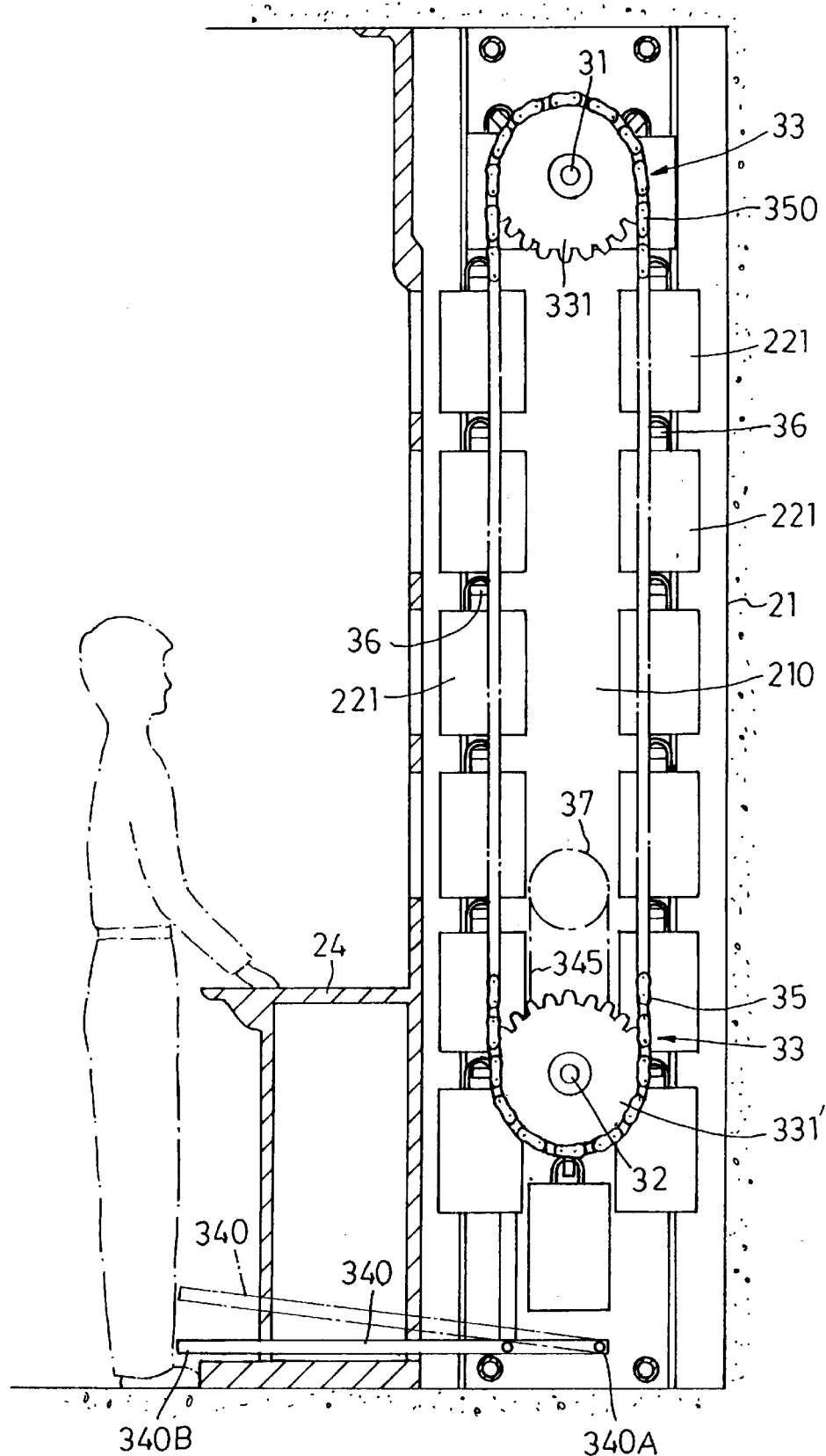
FIG. 5 is a schematic side view illustrating a box set of the first preferred embodiment.

Referring to FIGS. 3 to 5, the cabinet body 21 has an interior chamber 210, in which an upper rail 31, a lower rail 32, and several box sets 33 are disposed. Each of the box sets 33 is aligned with a respective column of compartments 22, and includes an upper sprocket 331 sleeved rotatably on the upper rail 31, a lower sprocket 331' sleeved rotatably on the lower rail 32, an endless flexible member, such as a first chain 35, and a series of boxes 221 which are attached to the chain 35 and which are spaced apart from each other. Each of the chains 35 engages a corresponding one of the upper sprockets 331 and a corresponding one of the lower sprockets 331', and includes a series of interconnected links 350, and a plurality of pivot rods 36 which are fixed respectively to some of the links 350. Each of the boxes 221 has a top surface, which is formed with two fixed lugs 224, that are sleeved rotatably on a respective one of the pivot rods 36, thereby permitting rotation of each of the boxes 221 about a corresponding one of the pivot rods 36.

A driving unit can be actuated to activate all of the chains 35 to circulate behind the compartments 22, and includes a power source 341 (see FIG. 3) and a horizontal driving shaft 342 which is journalled in the cabinet body 21 (see FIG. 3). In this case, each of the boxes 221 can pass through each of corresponding column of the compartments 22.

Five switch members, such as rotary levers 340, are connected respectively to the box sets 33. Each of the rotary levers 340 has a pivot end 340A which is mounted rotataby in a lower end portion of the cabinet body 21, and a free end 340B which extends out of the platform 24.

Each of the rotary levers 340 is positioned normally at a disengaging position indicated by the phantom lines in FIG. 5, in which a corresponding one of the chains 35 is disengaged from the driving unit so that the corresponding one of the chains 35 is static even if the driving unit is actuated. During circulation of the chains 35 by actuation of the driving unit, if it is desired to adjust the position of a selected one of the boxes 221, a corresponding one of the rotary levers 340 can be turned to an engaging position indicated by the solid lines in FIG. 5 so as to engage the corresponding one of the chains 35 with the driving unit, thereby circulating the corresponding chain 35. At the time the selected box 221 arrives in a selected one of the compartments 22, the corresponding rotary lever 340 is turned back to the disengaging position, thereby preventing movement of the selected box 221 in the cabinet body 21. This operation of the rotary levers 340 will described hereinafter with reference to FIGS. 6 and 7.

Figure 6:
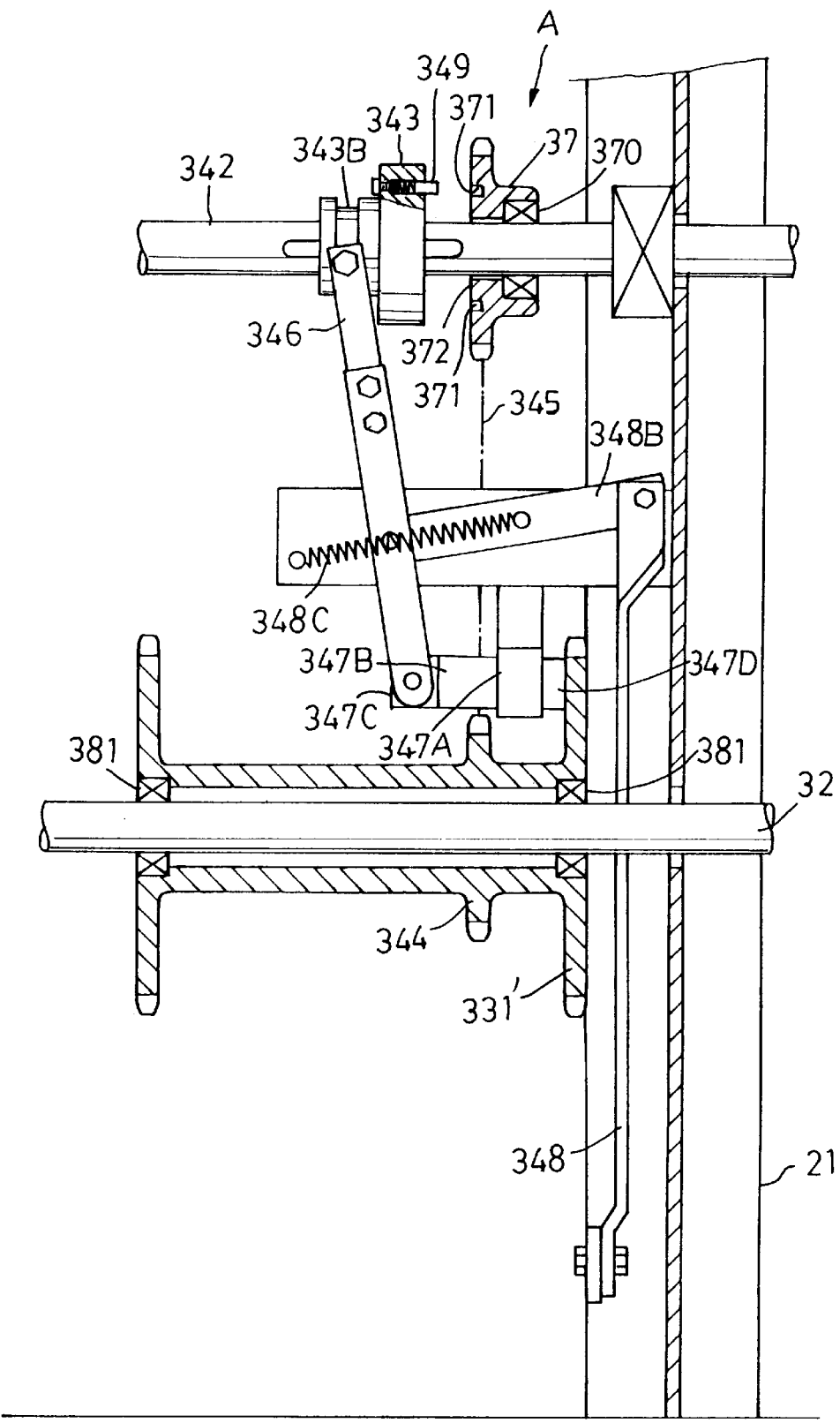
FIG. 6 is a schematic front view of a clutch and brake assembly of the first preferred embodiment, illustrating how a box set is stopped by moving the switch member to a disengaging position in accordance with this invention.

Five clutch and brake assemblies (A) (only two are shown in FIG. 3) are disposed in the cabinet body 21, and connect respectively the box sets 33 to the driving shaft 342. As best shown in FIG. 6, each of the clutch and brake assemblies (A) includes a driving sprocket 37, a horizontal driven shaft 38, a tubular clutch member 343, a driven sprocket 344, an endless second chain 345, a crank 346, a guiding sleeve 347A, a gripping rod 347B, a generally vertical connecting rod 348A, a generally horizontal connecting rod 348B, and a generally horizontal tension spring 348C. As illustrated, the driving sprocket 37 is sleeved rotatably on the driving shaft 342, and is positioned at an axial position on the driving shaft 342 by means of a bearing unit 370. A plurality of circumferentially arranged grooves 371 are formed in an engaging surface 372 (see FIG. 6) of the driving sprocket 37, and constitute a groove unit.

The horizontal driven shaft 38 is hollow, and is sleeved rotatably on the lower rail 32 by means of bearing units 381. As illustrated, the driven shaft 38 is located under and parallel to the driving shaft 342. A respective one of the lower sprockets 331' is sleeved fixedly on the driven shaft 38.

The tubular clutch member 343 is sleeved movably on the driving shaft 342, and is spaced apart from the driving sprocket 37. As illustrated, the clutch member 343 has an axial keyway 343A (see FIGS. 8 and 9) in which a fixed axial key 343A' (see FIGS. 8 and 9) of the driving shaft 342 is engaged slidably. A spring-biased tongue member 349 is disposed on the clutch member 343, and is biased to move toward the groove unit, consisting of the grooves 371 in the driving sprocket 37.

The driven sprocket 344 is sleeved fixedly on the driven shaft 38.

The second chain 345 engages the driving sprocket 37 and the driven sprocket 344.

The crank 346 has a generally Y-shaped upper end portion with two prongs 346A, which have upper ends that are mounted pivotally within an annular groove 343B in an outer surface of the clutch member 343 to permit rotation of the clutch member 343 with the driving shaft 342 when the driving unit is activated. Particularly, each of the prongs 346A of the crank 346 includes a threaded hole 346B formed therethrough, and a lock bolt 346C which engages the threaded hole 346B in the prong 346A to press against a sliding bearing member 343C. As such, during rotation of the driving shaft 342, the clutch member 343 can rotate with the driving shaft 342 while permitting rotation of the crank 346 about the lock bolts 346C and sliding movement of the clutch member 343 on the driving shaft 342.

An intermediate portion of the crank 346 is connected to a corresponding one of the switch members 340.

The horizontal guiding sleeve 347A is fixed in the cabinet body 21, and is located near the lower sprocket 331'.

The gripping rod 347B extends through the guiding sleeve 347A, and has a pivot end 347C which is connected pivotally to a lower end of the crank 346, and a pressing end 347D which presses against the lower sprocket 331' to prevent rotation of the lower sprocket 331' in the cabinet body 21.

Figure 8:
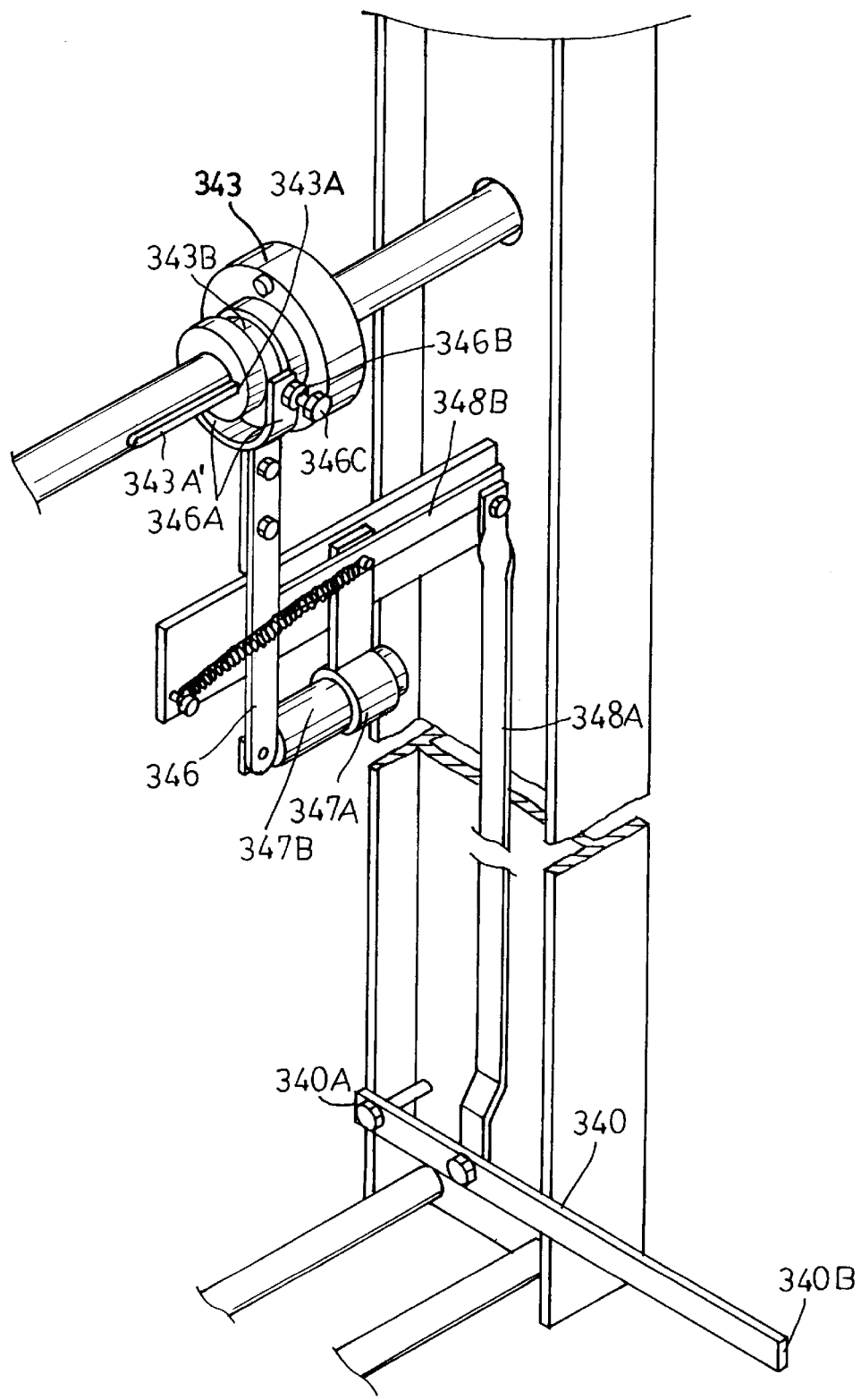
FIG. 8 is a perspective view illustrating how a clutch member is connected to a switch member of the first preferred embodiment.
Figure 9:
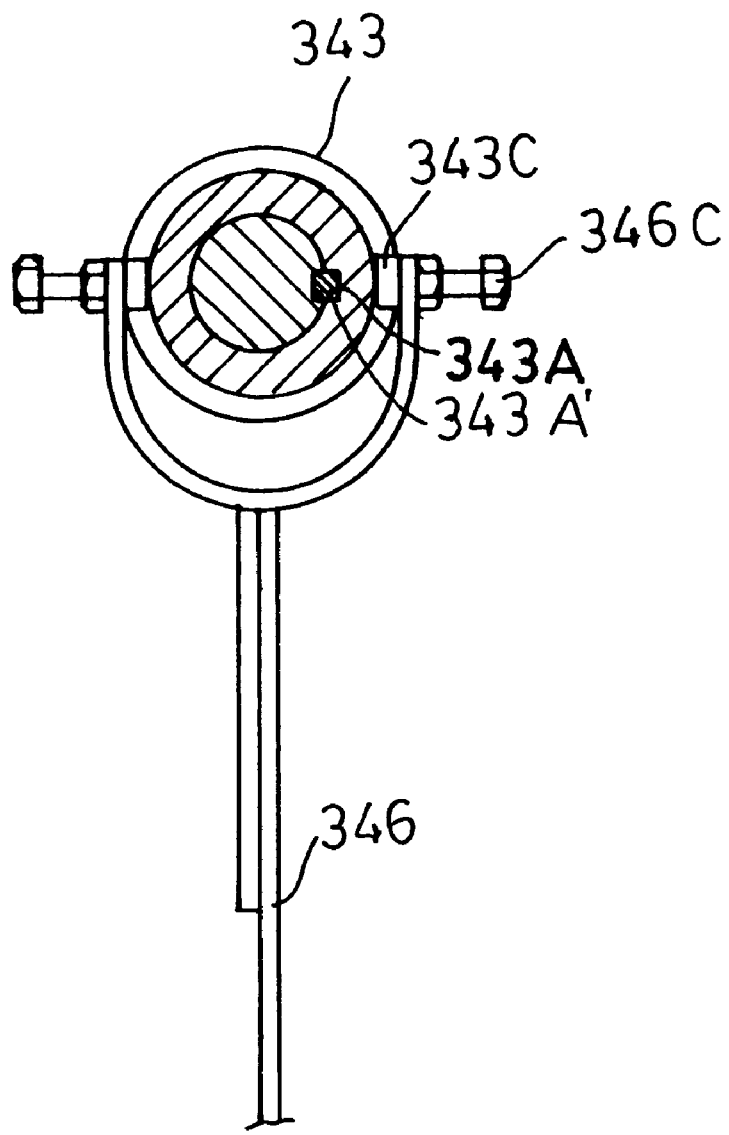
FIG. 9 is a schematic sectional view illustrating the engagement of a key of the clutch member with a keyway in a driving shaft of the first preferred embodiment.

As best shown in FIG. 8, the vertical connecting rod 348A has a lower end, which is pivoted to an intermediate portion of the associated rotary lever 340.

The horizontal connecting rod 348B is connected pivotally to an upper end of the vertical connecting rod 348A at one end thereof, and to an intermediate portion of the crank 346 at the other end thereof.

Referring again to FIG. 6, the coiled tension spring 348C has a first or left end which is fixed in the cabinet body 21, and a second end which is fixed to the horizontal connecting rod 348B. As illustrated, the tension spring 348C is in a stretched state to apply a lateral pull to the vertical connecting rod 348A, thereby preventing vertical movement of the vertical connecting rod 348A in the cabinet body 21.

Figure 7:
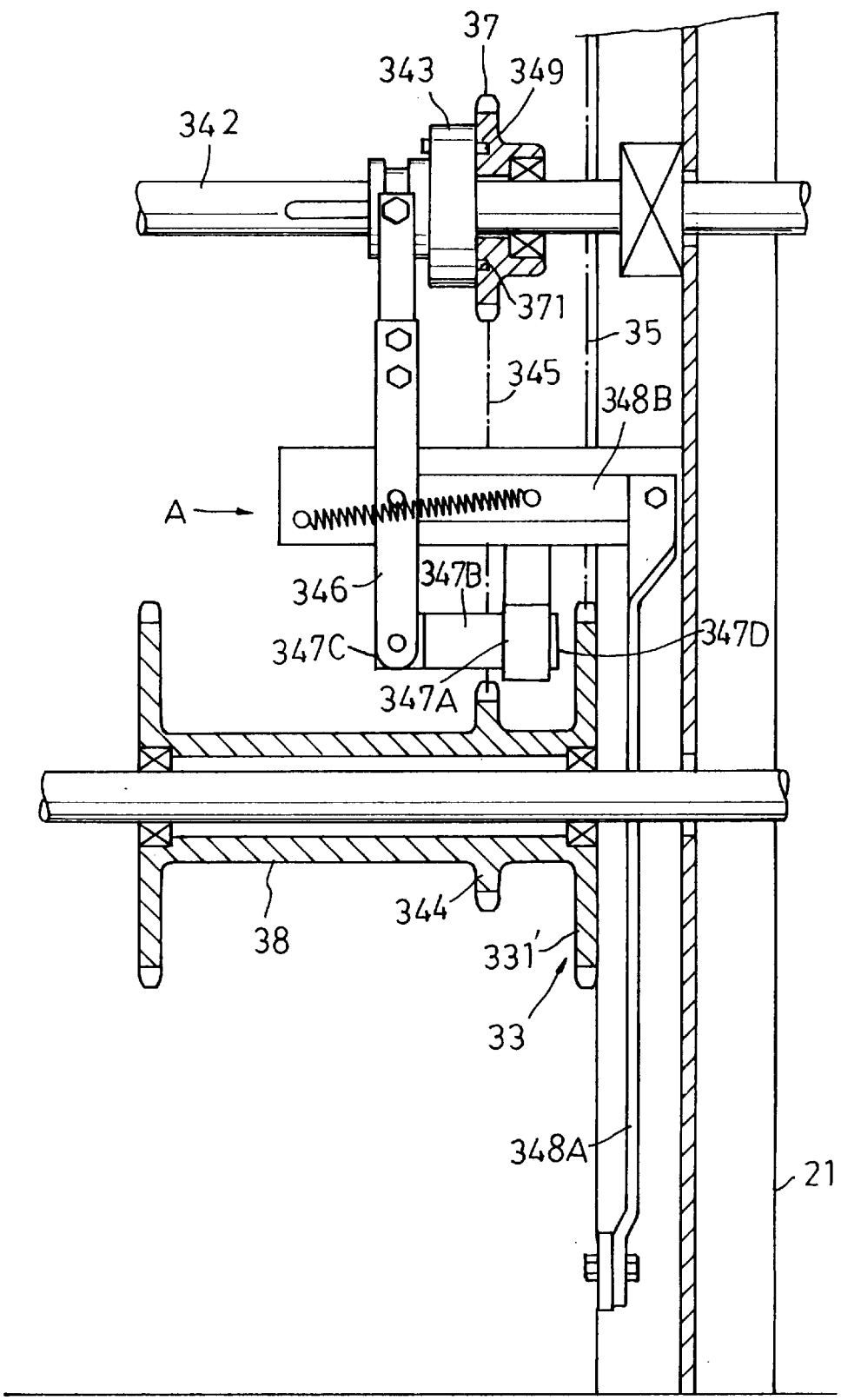
FIG. 7 is a schematic front view of the clutch and brake assembly of the first preferred embodiment, illustrating how a box set is activated by moving the switch member to an engaging position in accordance with this invention.

Referring to FIG. 7, when the rotary lever 340 is turned downward to the engaging position indicated by the phantom lines in FIG. 5, the vertical connecting rod 348A moves downward so as to move the tension spring 348C to a non-stretched position, in which the horizontal connecting rod 348B activates the crank 346, thereby engaging the clutch member 343 with the driving sprocket 37. At this time, when the driving source 341 (see FIG. 3) is energized to rotate the driving shaft 342 and the clutch member 343, the spring-biased tongue member 349 of the clutch member 343 engages one of the grooves 371 in the driving sprocket 37, thereby rotating the driving sprocket 37 with the driving shaft 343. Rotation of the driving sprocket 37 is transferred to the lower sprocket 331' through the chain 345 and the driven sprocket 344. In this way, the chain 35 can be rotated until the rotary lever 340 (see FIG. 5) is moved back to the disengaging position indicated by the solid lines in FIG. 5.

Figure 10:
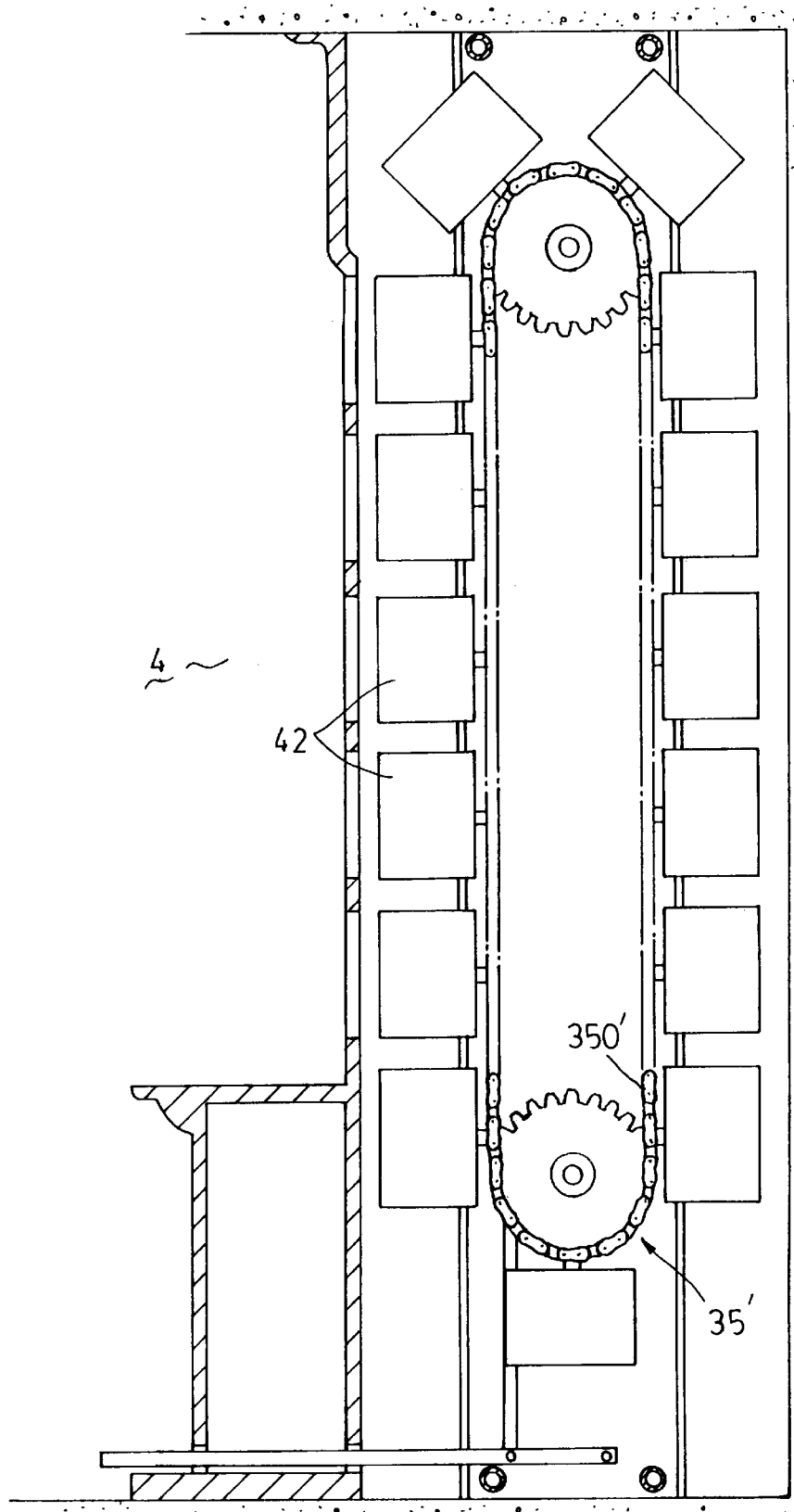
FIG. 10 is a schematic side view illustrating a box set of a second preferred embodiment of an altar according to this invention.

Referring to FIG. 10, a second preferred embodiment of an altar 4 of this invention is shown to be similar to the first embodiment in construction except that, in this embodiment, the boxes 42 are fixed respectively to the links 350' of the chains 35'. With this invention thus explained, it is apparent that numerous modifications and variations can be made without departing from the scope and spirit of this invention. It is therefore intended that this invention be limited only as indicated in the appended claims.

I claim:

1. An altar including a cabinet body and a platform which is located in front of said cabinet body, said platform having a flat top surface, said cabinet body having a front surface which is formed with several columns of compartments that are formed in an upper portion thereof and that are located above said top surface of said platform, wherein the improvement comprises said cabinet body having an interior chamber and several box sets which are disposed in said interior chamber, each of said compartments being provided with an openable door, each of said box sets being aligned with a respective one of said columns and including an endless flexible member and a plurality of boxes which are attached to said flexible member and which are spaced apart from each other, said altar further including:

a driving unit which can be actuated to activate all of said flexible members to circulate behind said compartments in such a manner that each of said boxes can pass through each of said compartments in a corresponding one of said columns;

several switch members connected respectively to said box sets, each of said switch members being positioned at a disengaging position in which a corresponding one of said flexible members is disengaged from said driving unit so that the corresponding one of said flexible members is static even if said driving unit is activated, each of said switch members being capable of being moved to an engaging position, in which the corresponding one of said flexible members circulates by engaging said driving unit when said driving unit is activated;

wherein each of said box sets includes an upper sprocket, and a lower sprocket that is disposed under said upper sprocket, said upper and lower sprockets being mounted rotatable within said interior chamber and being capable of being rotated by said driving unit, each of said flexible members being a first chain which engages a respective one of said upper sprockets and a respective one of said lower sprockets; and wherein said driving unit includes a power source disposed on said cabinet body, and a horizontal driving shaft which is journalled in said cabinet body and which can be rotated by said driving unit, said altar further including several clutch and brake assemblies which connect respectively said box sets to said driving shaft, each of said clutch and brake assemblies includes:

a driving sprocket sleeved rotatably on said driving shaft and positioned at an axial position on said driving shaft, said driving sprocket having an engaging surface which is formed with a groove unit;

a horizontal driven shaft journalled in said cabinet body and located under and parallel to said driving shaft, a respective one of said lower sprockets being sleeved fixedly on said driven shaft, said driven shaft including a driven sprocket sleeved fixedly on said driven shaft;

an endless second chain engaging said driving sprocket and said driven sprocket;

an axial key fixed on said driving shaft;

a tubular clutch member sleeved movably on said driving shaft and spaced apart from said driving sprocket, said clutch member including an axial keyway in which said key of said driving shaft is engaged slidably, a spring-biased tongue member which is biased to move toward said groove unit in said driving sprocket, and an annular groove formed in an outer surface of said clutch member;

a crank having a generally Y-shaped upper end portion with two prongs which have upper ends that are mounted pivotally within said annular groove in said clutch member to permit rotation of said clutch member with said driving shaft when said driving unit is activated, an intermediate portion connected to a corresponding one of said switch members, and a lower end;

a gripping rod having a pivot end which is connected pivotally to said lower end of said crank, and a pressing end which presses against said lower sprocket to prevent rotation of said lower sprocket in said cabinet body; and a guiding member fixed in said cabinet body for guiding said gripping rod to move horizontally in said cabinet body;

the corresponding one of said switch members being connected to said crank so that, when said switch member is moved to said engaging position, said clutch member moves to engage said driving sprocket for engaging said tongue member of said clutch member within said groove unit in said driving sprocket, and said gripping rod separates from said lower sprocket.

2. An altar as claimed in claim 1, wherein each of said clutch and brake assemblies has two sliding bearing members which are received slidably within a corresponding one of said annular grooves in said driving shaft, two threaded holes which are formed respectively through said upper ends of said prongs of of said crank, and two lock bolts which engage respectively said threaded holes in said prongs to press against said sliding bearing members.

3. An altar as claimed in claim 1, wherein said guiding member is a horizontal guiding sleeve fixed in said cabinet body and located near said lower sprocket, said gripping rod extending through said guiding sleeve.

4. An altar as claimed in claim 3, wherein each of said switch members is a generally horizontal rotary lever, which has a pivot end mounted rotatably within a lower end portion of said cabinet body, and a free end extending out of said platform, each of said clutch and brake assemblies further including:

a generally vertical connecting rod having a lower end pivoted to an intermediate portion of a corresponding one of said rotary levers, and an upper end;

a generally horizontal connecting rod connected pivotally to said upper end of said vertical connecting rod at one end thereof and to an intermediate portion of a corresponding one of said cranks at the other end thereof; and a generally horizontal coiled tension spring having a first end fixed in said cabinet body, and a second end fixed to an assembly of said vertical and horizontal connecting rods, said tension spring being in a stretched state to apply a lateral pull to said vertical connecting rod, thereby preventing vertical movement of said vertical connecting rod in said cabinet body, said tension spring returning to a non-stretched position when a corresponding one of said rotary levers is turned downward to said engaging position.

* * * * *